United States Patent
Zhang et al.

(10) Patent No.: US 11,658,741 B1
(45) Date of Patent: May 23, 2023

(54) OPTICAL DETECTION DEVICE AND SYSTEM

(71) Applicant: SUZHOU MI TU OPTOELECTRONIC TECHNOLOGY CO. LTD., Suzhou (CN)

(72) Inventors: Zhi Zhang, Suzhou (CN); Xiao Han, Suzhou (CN); Xianglin Xiang, Suzhou (CN)

(73) Assignee: SUZHOU MI TU OPTOELECTRONIC TECHNOLOGY CO. LTD., Jiangsu (CN)

( * ) Notice: Subject to any disclaimer, the term of this patent is extended or adjusted under 35 U.S.C. 154(b) by 0 days.

(21) Appl. No.: 17/724,430

(22) Filed: Apr. 19, 2022

(30) Foreign Application Priority Data

Nov. 24, 2021 (CN) .......................... 202111425830.5

(51) Int. Cl.
  *H04B 10/079* (2013.01)
  *H04B 10/2575* (2013.01)
  *H04B 10/077* (2013.01)

(52) U.S. Cl.
  CPC ... *H04B 10/07955* (2013.01); *H04B 10/0777* (2013.01); *H04B 10/25759* (2013.01)

(58) Field of Classification Search
  None
  See application file for complete search history.

(56) References Cited

U.S. PATENT DOCUMENTS

| | | | |
|---|---|---|---|
| 2007/0125949 A1* | 6/2007 | Murata | G01J 1/46 348/E5.09 |
| 2009/0269084 A1* | 10/2009 | Mizuno | H04B 10/69 398/202 |
| 2013/0068926 A1* | 3/2013 | Okada | G01J 1/44 250/206 |
| 2014/0266368 A1* | 9/2014 | Utsunomiya | H03K 5/153 327/208 |
| 2019/0250031 A1* | 8/2019 | Ding | G01J 1/42 |

* cited by examiner

*Primary Examiner* — David W Lambert
(74) *Attorney, Agent, or Firm* — SZDC Law P.C.

(57) ABSTRACT

An optical detection device includes a photocurrent input terminal; a first branch connected to the photocurrent input terminal includes a plural of MOS transistors; a second branch connected to the photocurrent input terminal includes a plural of MOS transistors. The MOS transistors in the first branch and the MOS transistors in the second branch are arranged in a mirror image manner; a control module connected to the first branch and the second branch to turn on or off the MOS transistors in the second branch; a first auxiliary current input terminal connected to the first branch and a second auxiliary current input terminal connected to the first branch, which are used to compensate the current of the MOS transistors in the first branch; a first current output terminal connected to the first branch and the second branch.

12 Claims, 7 Drawing Sheets

OPTICAL DETECTION DEVICE AND SYSTEM

This application claims priority to Chinese Patent Application No. 202111425830.5, filed on Nov. 24, 2021, which is incorporated by reference for all purposes as if fully set forth herein.

FIELD OF THE DISCLOSURE

The present disclosure relates to an optical detection device and system, which belongs to the optical communication technology.

BACKGROUND

Currently, a photo diode (PD) is normally used for the optical input terminal to convert optical signals into current signals. Since the working current and leakage current generated by the PD are usually weak and accompanying a large amount of noise, the working current needs to be transmitted into the optical detection device (e.g., transimpedance amplifier, TIA) first for noise-suppression and current-amplification to detect the optical intensity or test the leakage current of the PD, thereby checking the quality of the PD.

Figure 1:
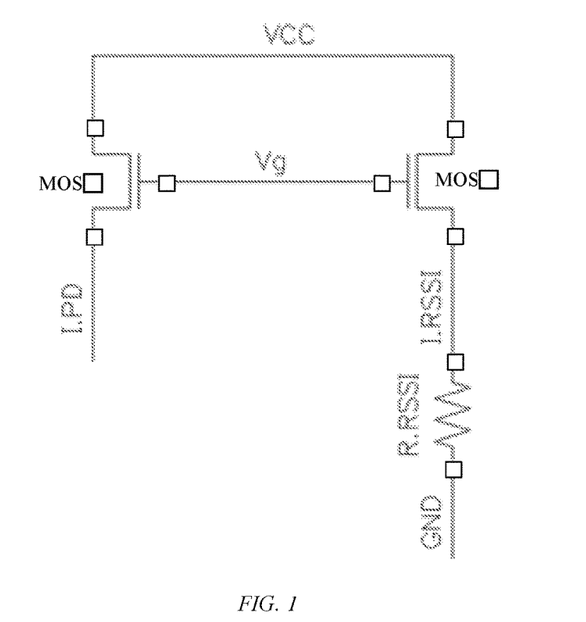
FIG. 1 is a schematic diagram of a conventional optical detection device provided by an embodiment of the present disclosure.

Referring to FIG. 1, a traditional optical detection device normally comprises two metal-oxide-semiconductor field-effect transistors arranged in a mirror manner to convert the output current of the PD into the mirroring output current $I_{RSSI}$; and the output current $I_{RSSI}$ passes through the sense resistor $R_{RSSI}$ to generate a detection voltage; therefore, the intensity of the optical signal input to the PD can be determined according to the value of the detection voltage.

The range of the photocurrent output by the PD is from 10 uA to 10 mA, which is larger than the detection range of the traditional optical detection devices, and accuracy of those devices would be lower if the photocurrent goes outside their detection range. Meanwhile, if those optical detection devices are used to detect the photocurrent with a dynamic range from 1 nA to 10 mA which is far beyond a conventional circuit's capacity, the accuracy would be lower as well.

SUMMARY

Provided is an optical detection device and system to solve the problem of the lower accuracy for the current beyond the detection range due to the small current detection range of the traditional optical detection devices. The present disclosure provided an adaptive structure to expand the dynamic detection range, detect the leakage current of the PD, and improve the detection accuracy at the same time.

In accomplishing the above and other objects, there has been provided:

Firstly, provided an optical detection device comprising an optical detection module wherein the optical detection module comprising:

a photocurrent input terminal configured to receive the photocurrent output by the photoelectric conversion device;

a first branch connected to the photocurrent input terminal, comprising at least three MOS transistors, a second branch connected to the photocurrent input terminal, comprising at least three MOS transistors, wherein the MOS transistors in the first branch and the MOS transistors in the second branch are arranged in a mirror image manner;

a control module connected to the first branch and the second branch to switch on or off the MOS transistors in the second branch under the control of the control voltage;

a first auxiliary current input terminal connected to the first branch and a second auxiliary current input terminal connected to the first branch, which are used to compensate the current of the MOS transistors in the first branch when the photocurrent is a leakage current;

a first current output terminal connected to the first branch and the second branch, wherein the current value of the photocurrent is determined based on the current from the first current output terminal.

Optionally, the first branch comprises:

a first MOS transistor connected to the photocurrent input terminal and the first auxiliary current input terminal;

a second MOS transistor connected to the second auxiliary current input terminal.

Optionally, when the optical detection device detects the leakage current of the photoelectric conversion device, the control voltage controls the cut-off of the MOS transistors in the second branch;

the first auxiliary current of the first auxiliary current input terminal and the leakage current of the photocurrent input terminal make the first MOS transistor operate in the saturation mode;

the second auxiliary current of the second auxiliary current input terminal makes the second MOS transistor operate in the saturation mode.

Optionally, the control module comprises a first control switch and a second control switch wherein, when the first control switch is off, and the second control switch is on, the MOS transistors in the second branch are turned off, and the optical detection module is in the leakage current detection mode;

when the second control switch is off, and the first control switch is on, the MOS transistors in the second branch are turned on, and the optical detection module is in the working current detection mode.

Optionally, one end of the first control switch is connected to the G poles of the MOS transistors in the first branch, and the other end is connected to the G poles of the MOS transistors in the second branch;

one end of the second control switch is connected to the G poles of the MOS transistors in the second branch, and the other end is connected to the voltage source.

Optionally, the optical detection device further comprises a trigger module to output control voltage, wherein the first output terminal of the trigger module is connected to the first control switch to turn on or off the first control switch through the first control voltage;

the second output terminal of the trigger module is connected to the second control switch to turn on or off the second control switch through the second control voltage.

Optionally, the optical detection module further comprises a second current output terminal connected to the first branch and the second branch;

wherein the input terminal of the trigger module is connected to the second current output terminal through a voltage detection circuit, so as to convert the output current of the second current output terminal into a voltage signal and input it to the trigger module;

when the photocurrent is a leakage current, the voltage detection circuit converts the output current of the second current output terminal into a first voltage signal and inputs it to the trigger module, thereby making the first control voltage a low-level, and the second control voltage a high-level;

when the photocurrent is a working current, the voltage detection circuit converts the output current of the second current output terminal into a second voltage signal and inputs it to the trigger module, thereby making the first control voltage a high-level, and the second control voltage a low-level.

Optionally, when there are at least two second branches configured, each second branch corresponds to a group of first control switches and second control switches, and each second branch corresponds to a trigger module and a voltage detection circuit connected to the trigger module.

The detection range of the working current corresponding to each second branch varies, and the flipped voltage of the trigger module corresponding to each second branch varies as well, as used herein, the flipped voltage refers to the voltage value that making the first control voltage and the second control voltage flip.

Optionally, the trigger module is a Schmitt trigger; and the voltage detection circuit comprises a sense resistor with one end grounded and the other end connected to the second current output terminal as well as the input terminal of the trigger module;

the resistance value of the sense resistor meets the following conditions:

R_det*($I_{pd.leak}$+Isink1) is less than or equal to the flipped voltage of the Schmitt trigger;

and R_det*(I_PD+Isink1) is greater than the flipped voltage of the Schmitt trigger;

where R_det is the resistance value of the sense resistor, $I_{pd.leak}$ is the leakage current, Isink1 is the first auxiliary current input by the first auxiliary current input terminal, I_PD is the working current.

Optionally, the first branch further comprises a third MOS transistor, the second branch comprises a third mirroring MOS transistor configured correspondingly; the second current output terminal is connected to the third MOS transistor and the third mirroring MOS transistor.

Optionally, the optical detection device further comprises an error amplifier comprising:

a first voltage input terminal used to receive a reference voltage;

a second voltage input terminal used to receive the reversed bias voltage from the photoelectric conversion device;

a voltage output terminal connected to the G poles of the MOS transistors in the first branch to input stable bias voltage to the MOS transistors in the first branch.

Optionally, the ratios between the length and width of the channels in different MOS transistors of the first branch are the same; the ratios between the length and width of the channels in different MOS transistors of the second branch are the same.

Secondly, provided is an optical detection system, comprising a photoelectric conversion device and an optical detection device connected to the photoelectric conversion device, wherein the optical detection device mentioned-above is adopted in the optical detection system.

The beneficial effects of the present disclosure may at least include:

an optical detection device comprises: a photocurrent input terminal configured to receive the photocurrent output by the photoelectric conversion device; a first branch connected to the photocurrent input terminal, comprising a plural of MOS transistors; a second branch connected to the photocurrent input terminal, comprising a plural of MOS transistors, wherein the MOS transistors in the first branch and the MOS transistors in the second branch are arranged in a mirror manner; a control module connected to the first branch and the second branch to turn on or off the MOS transistors in the second branch under the control of the control voltage; a first auxiliary current input terminal connected to the first branch and a second auxiliary current input terminal connected to the first branch, which are used to compensate the current of the MOS transistors in the first branch when the photocurrent is a leakage current; a first current output terminal connected to the first branch and the second branch, wherein the current value of the photocurrent is determined based on the current from the first current output terminal. It may solve the problem of low detection accuracy due to a dynamic detection range of the traditional optical detection devices which is smaller than the current range of the photocurrent output by the PD; make all the on-state MOS transistors in the first branch operate in the saturation mode when detecting the leakage current of the PD, and make all the on-state MOS transistors in the first branch and the second branch operate in the saturation mode when detecting the working current of the PD, thereby achieving a accurate detection of the leakage current and the working current.

In addition, the current output from the optical detection module control the trigger module to generate a control voltage to control the on/off of each branch in the optical detection module reversely, thereby realizing the adaptive control of the optical detection device.

Additionally, at least two second branches are configured; therefore the dynamic range of the PD current can be adaptively divided into at least three small ranges, to expand the dynamic range.

Furthermore, high detection accuracy and stable reversed bias voltage of the PD might be achieved through connecting the error amplifier to the optical detection module.

The foregoing explanation is only an overview of the technical scheme of this disclosure. In order to better understand the technical means of this disclosure and implement it in accordance with the content of the specification, the following is a better implementation example of this disclosure together with the attached drawings for detailed explanation.

DETAILED DESCRIPTION OF THE DISCLOSURE

Below are further described the specific implementation way of the present disclosure in conjunction with the drawings and examples. The following embodiments are used to clarify this disclosure but shall not limit the scope of this disclosure. The following embodiments are used to clarify this disclosure but shall not limit the scope of this disclosure.

The operation of a MOS transistor can be separated into three different modes: cutoff, saturation and ohmic mode (also known as the linear region). The MOS transistor is in the cutoff mode when it does not work. The MOS transistor in the ohmic mode when it starts to work, and the region between the drain and the source operates like a variable resistor controlled by the voltage $U_{GS}$. The saturation mode lies after the ohmic mode, where the region between the drain and the source operates like a current source controlled by the voltage $U_{GS}$. When the MOS transistor operates in the saturation mode, it acts better as an amplifier, thus the saturation mode is also known as the amplifier region.

Accordingly, referring to FIG. 1, when the MOS transistor is just turned on, and the current of which is low, it may operate in the ohmic mode. At this time, the MOS transistor of the optical detection device hasn't reached the saturation state, which results in a low detection accuracy.

Based on the above technical problems, in the present disclosure, a PD photocurrent mirroring circuit is added, thus the number of the on-state MOS transistors that supply current to the PD may be controlled by detecting the size of the mirroring current: when the current is low, the number of the on-state MOS transistors that supply current for the PD would decrease, while the current is high, the number of the on-state MOS transistors that supply the current for the PD would increase. So that in both the above conditions, the MOS transistors that supply current for the PD would always operate in the saturation mode, thereby ensuring the detection precision of the mirroring current, that is, the detection precision of the received signal strength indication current.

Meanwhile, in order to improve the detection accuracy for the leakage current of the PD, two auxiliary current input terminals are added, so that the on-state MOS transistors would operate in the saturation mode when detecting the leakage current of the PD.

Figure 2:
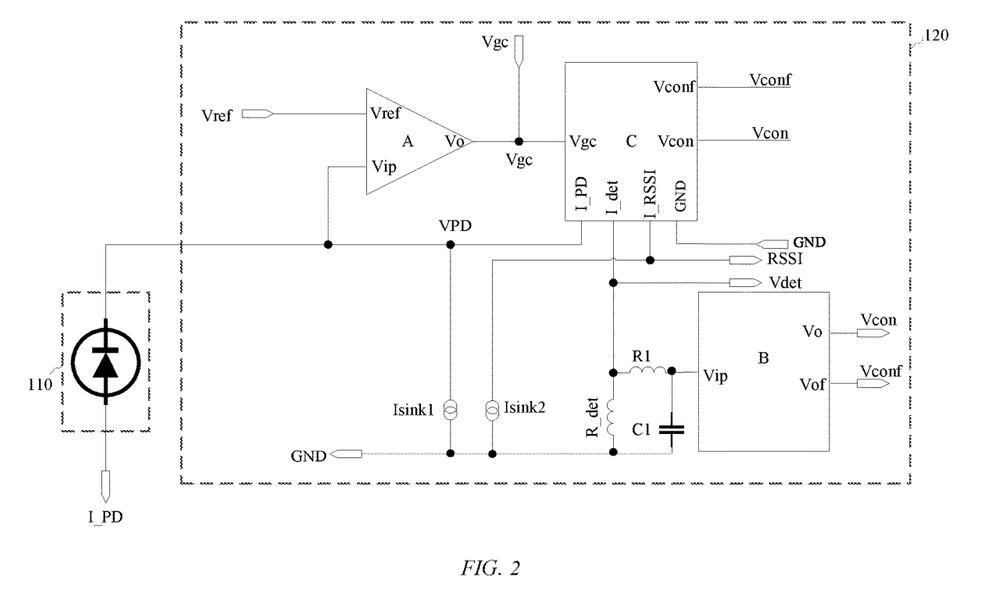
FIG. 2 is a schematic diagram of the optical detection system provided by an embodiment of the present disclosure.

An optical detection device and system provided by the present disclosure will be introduced below:

FIG. 2 shows an optical detection system of an embodiment provided by the present disclosure. This optical detection system includes a photoelectric conversion device 110 and an optical detection device 120 connected to the photoelectric conversion device 110.

The photoelectric conversion device 110 is used to convert the optical signal into the electrical signal to output. Illustratively, the photoelectric conversion device 110 may be implemented as a PD, and the number of PD is one or at least two. And this implementation of the photoelectric conversion device 110 is not limited in this embodiment.

The photoelectric conversion device 110 generates a working current (or bright current) when there is light irradiation. At this time, the photoelectric conversion device 110 converts the optical signal into working current and outputs it to the optical detection device 120 for optical intensity detection. The working current usually ranges from 10 μA to 100 mA.

When there is no light irradiation to the photoelectric conversion device 110, the leakage current (or dark current) is generated. The leakage current is usually at nA-level, which is much smaller than the working current. At this time, the photoelectric conversion device 110 outputs the leakage current to the optical detection device 120 for the leakage current detection.

The optical detection device 120 is used to receive the working current output by the photoelectric conversion device 110 for the optical intensity detection; or to receive the leakage current output by the photoelectric conversion device 110 for the leakage current detection.

Specially, the optical detection device 120 includes an optical detection module C; the optical detection module C comprises: a photocurrent input terminal I_PD, a first branch M, a second branch N, a control module SW, a first current output terminal I_RSSI, a first auxiliary current input terminal (FIG. 2 takes the pin which is also implemented as the photocurrent input terminal I_PD as an example for illustration), a second auxiliary current input terminal (FIG. 2 takes the pin which is also implemented as the first current output terminal I_RSSI as an example for illustration).

In another embodiment, the first auxiliary current input terminal may be implemented as a different pin from the photocurrent input terminal I_PD, or/and the second auxiliary current input terminal may be implemented as a different pin from the first current output terminal I_RSSI, This embodiment will not limit the implementation of the first auxiliary current input terminal and the second auxiliary current input terminal.

The photocurrent input terminal I_PD is used to receive the photocurrent from the photoelectric conversion device 110, and the photocurrent is the working current or the leakage current.

The first branch M and the second branch N are connected to the photocurrent input terminal I_PD, and each branch comprises at least three MOS transistors.

Optionally, in order to clearly illustrate this embodiment, the design of the two branches is simplified as follows: the ratios between the length and width of the channels in different MOS transistors of the first branch are the same; the ratios between the length and width of the channels in different MOS transistors of the second branch are the same.

Figure 3:
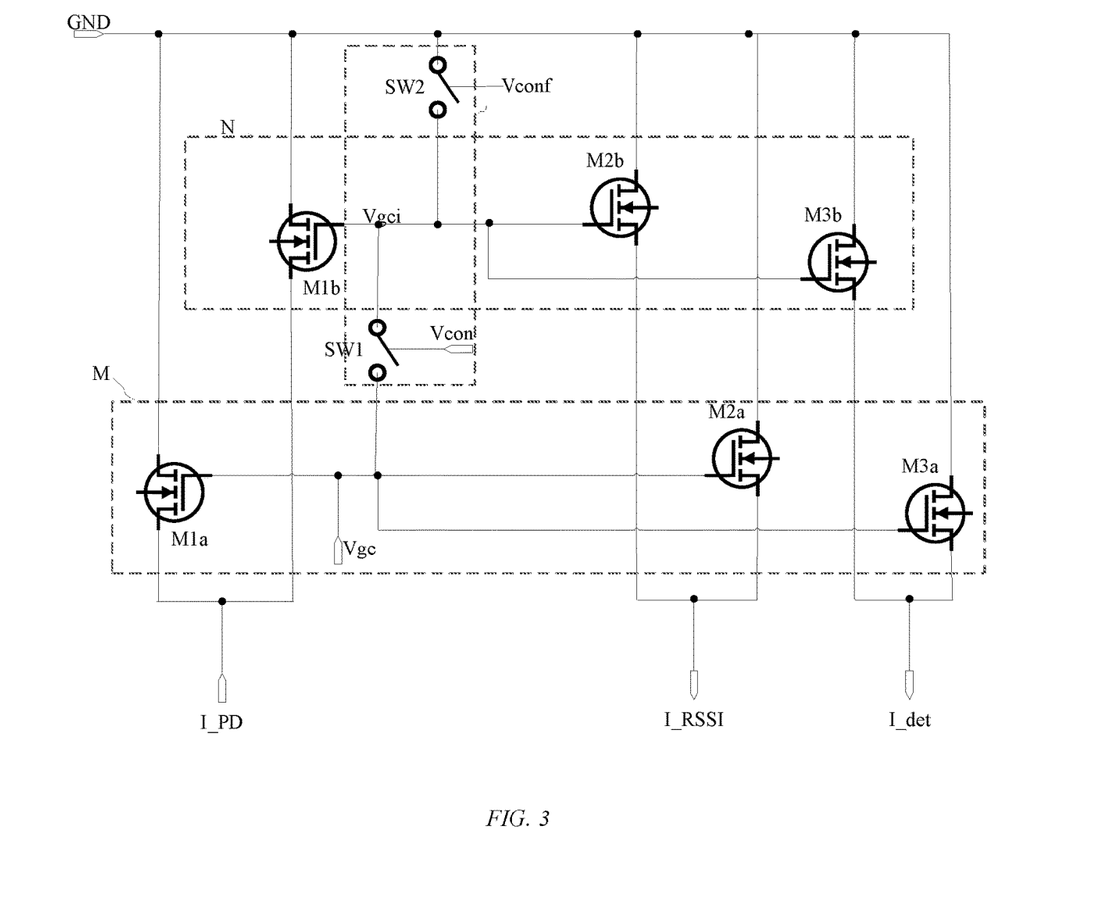
FIG. 3 is a schematic diagram of the optical detection module provided by an embodiment of the present disclosure.

Referring to FIG. 3, MOS transistors M1a, M2a, M3a in the first branch M and MOS transistors M1b, M2b, M3b in the second branch N are arranged in mirror image manner. Specially, M1a/M1b mirror image, M2a/M2b mirror image, M3a/M3b mirror image. The photocurrent I_PD is divided into two branches by M1a/M1b, and the mirroring current is divided into two branches by M2a/M2b and M3a/M3b, respectively. In the embodiment of FIG. 3, there are three MOS transistors in each branch, but the number of the MOS transistors may be more than three upon the practice, and this embodiment is not meant to be a limitation on the number of the MOS transistors.

Figure 4:
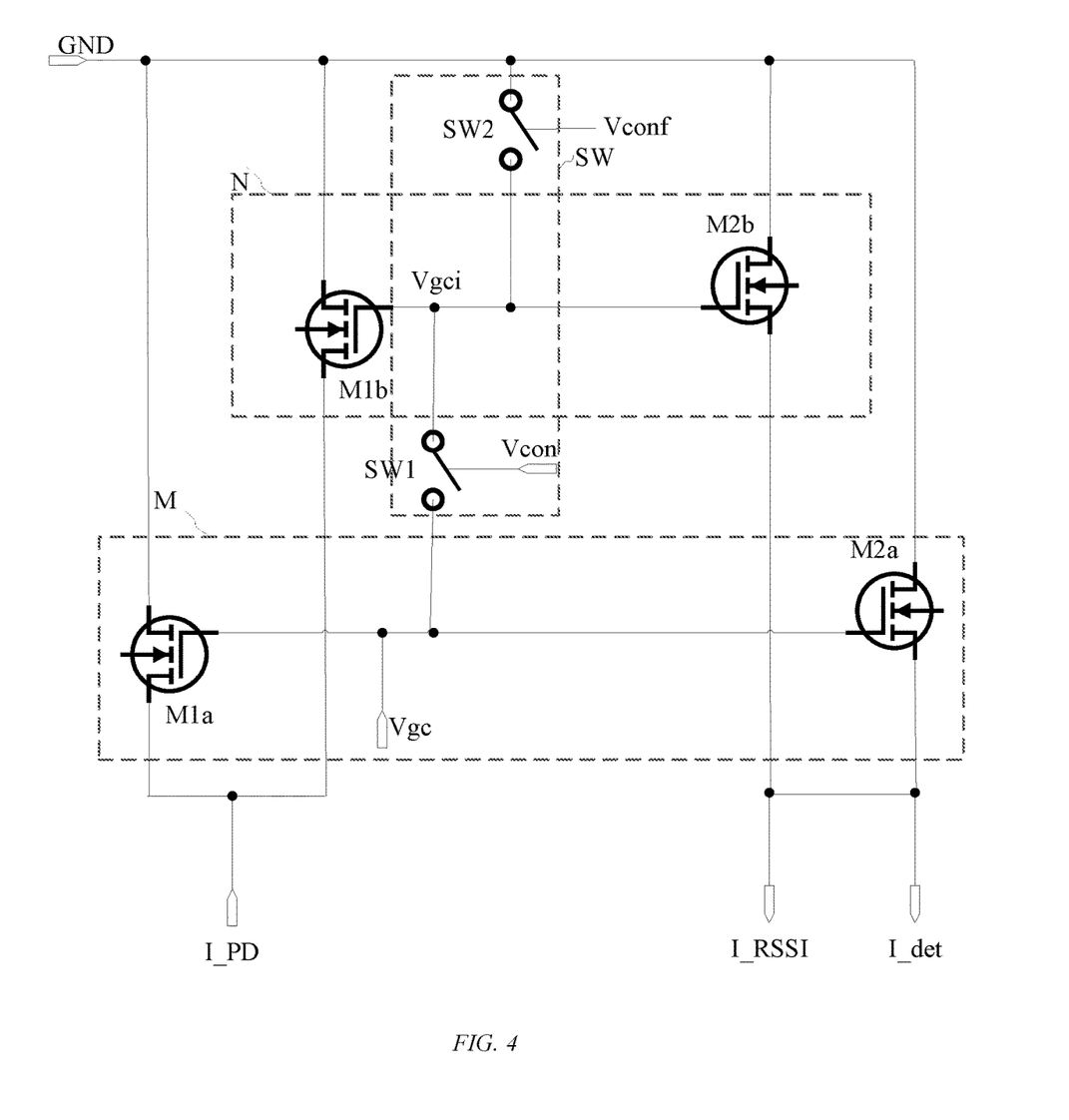
FIG. 4 is a schematic diagram of the optical detection module provided by an another embodiment of the present disclosure.

Optionally, the number of the MOS transistors in each branch may also be 2 for the optical detection device that only includes the optical intensity detection function as shown in FIG. 4, where the MOS transistors in the first branch and the MOS transistors in the second branch are arranged in mirror image manner.

Optionally, there is one second branch configured in the embodiment of FIG. 3, but the number of the second branch may be one or at least two upon the practice. And the number of second branches is determined based on the dynamic range of photocurrent.

Figure 5:
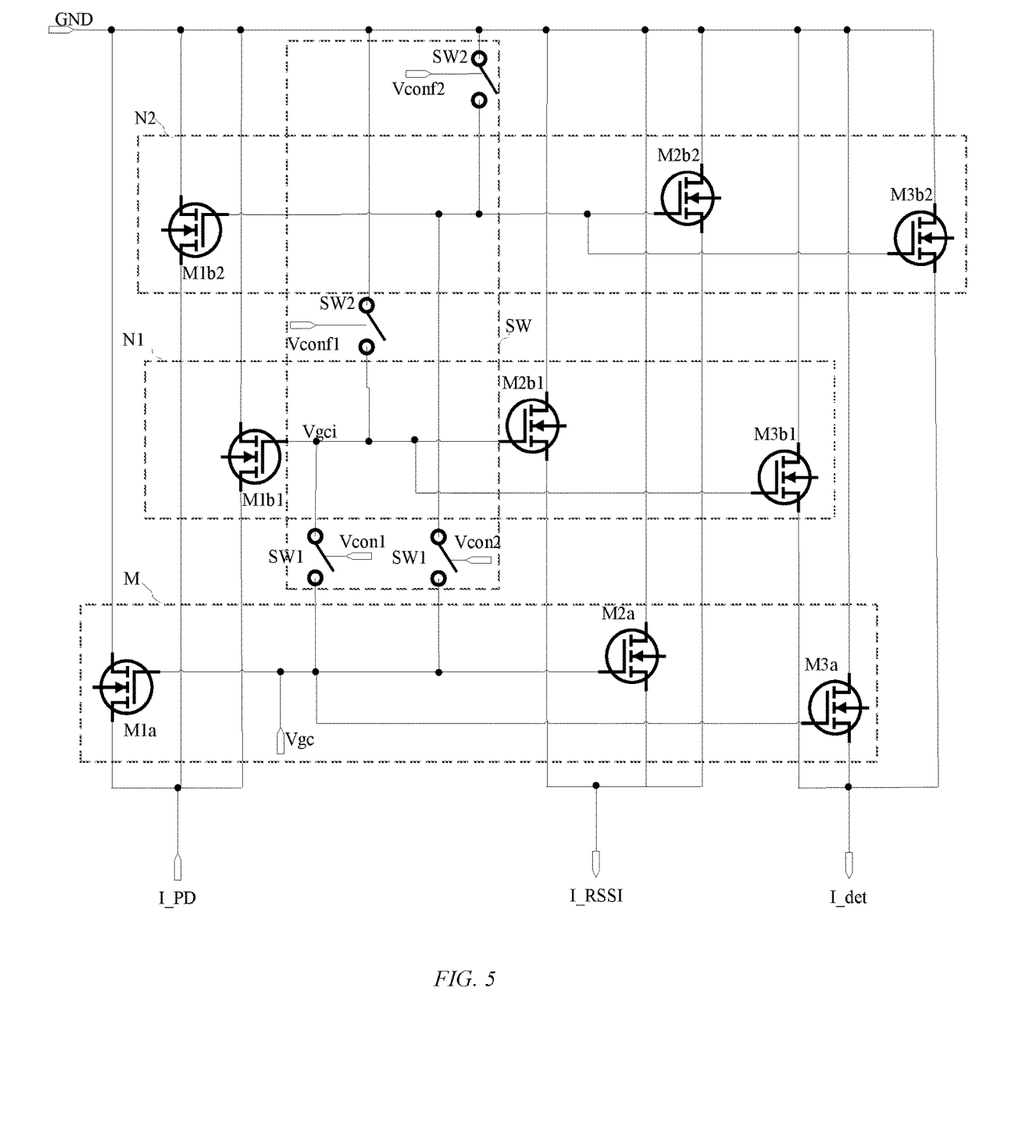
FIG. 5 is a schematic diagram of the optical detection module provided by an additional embodiment of the present disclosure.

There are two second branches N1 and N2 configured in the embodiment of FIG. 5, and according to FIG. 5, the MOS transistors in the second branches and the MOS transistors in the first branches are arranged in mirror image manner.

Optionally, the MOS transistors in the two branches may be implemented as NMOS or PMOS. The types of the MOS transistors in different branches may be the same or not, and the types of the MOS transistors in a same branch may be the same or not. In the present embodiment, the MOS transistors in the first branch M and the second branch N are implemented as NMOS. However, in the case of PMOS, the structure of the optical detection module C needs to be modified adaptively, such as: connecting the drains of the MOS transistors to VCC instead of GND.

A control module SW are connected to the first branch M and the second branch N to turn on or off the MOS transistors in the second branch N under the control of the control voltage;

Schematically, referring to FIG. 3 and FIG. 5, the control module SW corresponding to each second branch comprises a first control switch SW1 and a second control switch SW2. Optionally, the first control switch SW1 and the second control switch SW2 may both be implemented as single control switches.

When the first control switch SW1 is turned off and the second control switch SW2 is turned on, the MOS transistors in the second branch are turned off, and the optical detection module is in the leakage current detection mode; when the second control switch SW2 is turned off and the first control switch SW1 is turned on, the MOS transistors in the second branch are turned on, and the optical detection module is the working current detection mode.

Specifically, one end of the first control switch is connected to the G pole of each MOS transistor in the first branch, and the other end is connected to the G pole of each MOS transistor in the second branch; one end of the second control switch is connected to the G pole of each MOS transistor in the second branch, and the other end is connected to the voltage source.

When the MOS transistor is implemented as NMOS, the voltage source is connected to the ground wire; when the MOS transistor is implemented as PMOS, the voltage source is connected to the supply voltage VCC.

In the present embodiment, the first control switch SW1 and the second control switch SW2 of the control module corresponding to the second branch are implemented as two single control switches, however, the first control switch SW1 and the second control switch SW2 may implemented as a dual control switch upon the practice, and this embodiment is not meant to be a limitation on the implementation of the control module.

Optionally, the control voltage of the control module SW is generated by the trigger module. The trigger module may be implemented as included in the optical detection device, or as a separated device from the optical detection device. And this embodiment is not meant to be a limitation on the implementation of the trigger module. In the present embodiment of FIG. 2, the trigger module is included in the optical detection device to output the control voltage.

The first output terminal Vcon of the trigger module is connected to the first control switch to turn on or off the first control switch through the first control voltage.

Schematically, when the first control voltage is a high-level, the first control switch is turned on, when the first control voltage is a low-level, the first control switch is turned off. In another embodiment, the first control switch may be turned on when the first control voltage is a low-level, the first control switch may be turned off when the first control voltage is a high-level. And the present embodiment is not meant to be a limitation on the operation of the first control switch.

The second output terminal Vconf of the trigger module is connected to the second control switch to turn on or off the second control switch through the second control voltage.

Schematically, when the second control voltage is a high-level, the second control switch is turned on, when the second control voltage is a low-level, the second control switch is turned off. In another embodiment, the second control switch may be turned on when the second control voltage is a low-level, the second control switch may be turned off when the second control voltage is a high-level. And the present embodiment is not meant to be a limitation on the operation of the second control switch.

Optionally, the control voltage of the trigger module may be either generated by the an external device to input to the optical detection module, or generated based on the output current of the optical detection module, in this case, the trigger module adaptively switches the operation mode of the optical detection module according to the output current of the optical detection module, to achieve a adaptive switching between the optical intensity detection and the leakage current detection.

Optionally, in the case of that the control voltage of the trigger module is generated based on the output current of the optical detection module, the optical detection module further comprises a second current output terminal I_det connected to the first branch and the second branch. Accordingly, the input terminal of the trigger module is connected to the second current output terminal I_det through a voltage detection circuit, so as to convert the output current of the second current output terminal I_det into a voltage signal to input to the trigger module.

Schematically, when the photocurrent is a leakage current, the voltage detection circuit converts the output current of the second current output terminal into a first voltage signal to input to the trigger module, thereby making the first control voltage a low-level, and the second control voltage a high-level.

When the photocurrent is a working current, the voltage detection circuit converts the output current of the second current output terminal into a second voltage signal to input to the trigger module, thereby making the first control voltage a high-level, and the second control voltage a low-level.

Optionally, referring to FIG. 2, the voltage detection circuit comprises a sense resistor with one end grounded and the other end connected to the second current output terminal as well as the input terminal of the trigger module. In order to avoid the influence of high frequency, the sense resistor has two ends with cross-over connection a low-pass filter composed of resistor R1 and capacitor C1 upon the practice.

Figure 6:
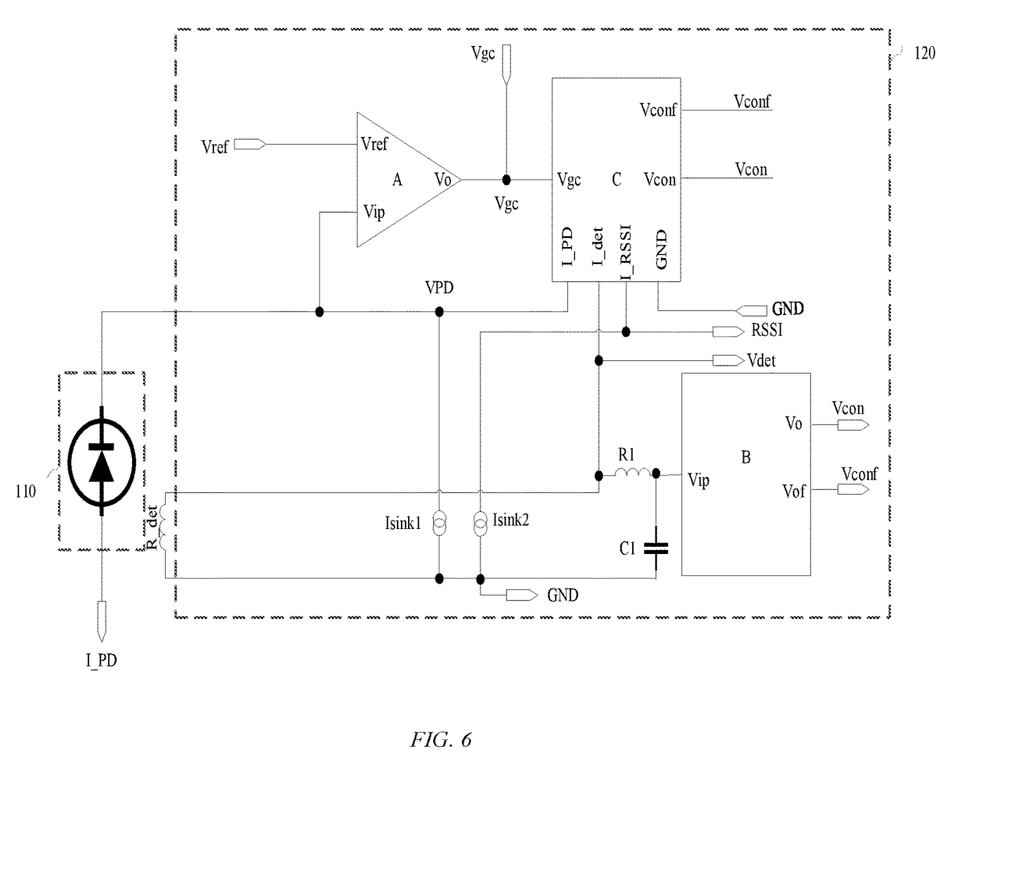
FIG. 6 is a schematic diagram of the optical detection system provided by an another embodiment of the present disclosure.

In the embodiment of FIG. 2, the voltage detection circuit is included in the optical detection device; however, the voltage detection circuit may be implemented as an external device separated from the optical detection device as shown in FIG. 6.

Optionally, when there are at least two branches, each second branch corresponds to a group of first control switches and second control switches, and each second branch corresponds to a trigger module and a voltage detection circuit connected to the trigger module; the detection range of working current corresponding to different second branches is different, and the flipped voltage of the trigger modules corresponding to different second branches is different. As used herein, the flipped voltage refers to the voltage value that causes the flip of the first control voltage and the second control voltage.

Figure 7:
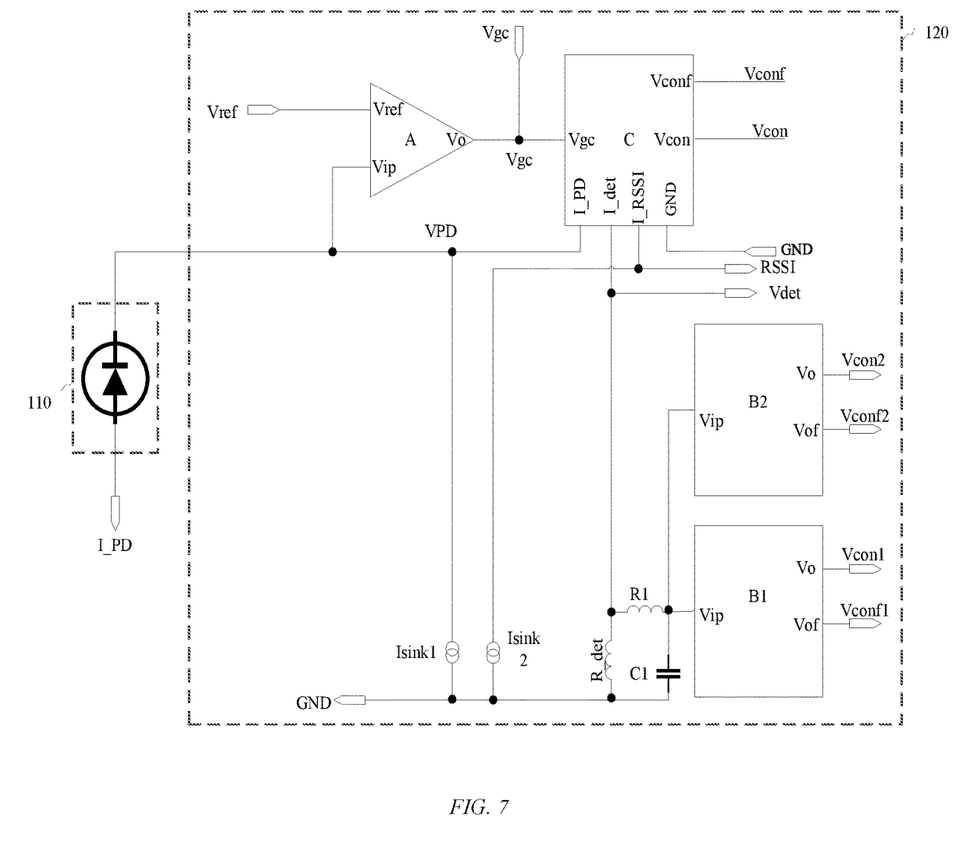
FIG. 7 is a schematic diagram of an optical detection device provided by an embodiment of the present disclosure.
Figure 8:
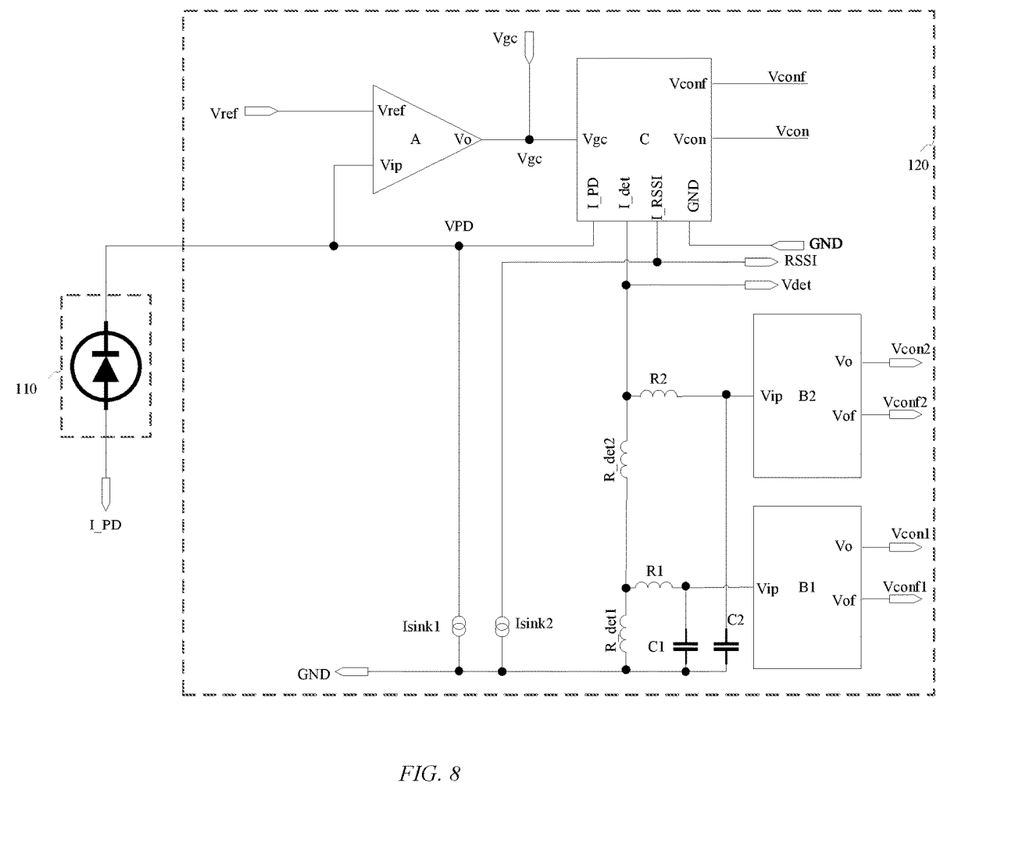
FIG. 8 is a schematic diagram of an optical detection device provided by an additional embodiment of the present disclosure.

Specifically, the schematic diagram of the trigger module in FIG. 7 and the schematic diagram of voltage detection circuit in FIG. 8 are corresponding to the optical detection module of FIG. 5 comprising two second branches, and as shown in FIG. 7 and FIG. 8, each second branch is corresponding to a trigger module and a voltage detection circuit.

A first auxiliary current input terminal and a second auxiliary current input terminal are connected to the first branch, which are used to compensate the current of the MOS transistors in the first branch when the photocurrent is leakage current.

Optionally, the first branch comprises a first MOS transistor connected to the photocurrent input terminal and the first auxiliary current input terminal, and a second MOS transistor connected to the second auxiliary current input terminal.

Specifically, when the optical detection device detects the leakage current of the photoelectric conversion device, the control voltage turns off the MOS transistors in the second branch; the first auxiliary current of the first auxiliary current input terminal and the leakage current of the photocurrent input terminal make the first MOS transistor operate in the saturation mode; the second auxiliary current of the second auxiliary current input terminal make the second MOS transistor operate in the saturation mode.

Optionally, when the optical detection device has the function of detecting the leakage current, the first branch further comprises a third MOS transistor, and the second branch comprises a third mirroring MOS transistor configured correspondingly; and the second current output terminal is connected to the third MOS transistor and the third mirroring MOS transistor.

When the optical detection device has the only function of detecting the optical intensity, the second current output terminal may be connected to the second MOS transistor in the first branch and the corresponding second mirroring MOS transistor in the second branch, wherein the second MOS transistor and the second mirroring MOS transistor are arranged in a mirror image manner.

In the case of detecting the working current of the photoelectric conversion device, the control voltage controls the MOS transistors in the first branch and the second branch to be turned on.

The first current output terminal is connected to the first branch and the second branch, wherein the current value of the photocurrent is determined based on the current from the first current output terminal.

The optical detection principle of the optical detection device is introduced blow.

Operation 1: detecting the leakage current. Since the leakage current ($I_{pd.leak}$) is as small as nA-level, the current mirror of the first MOS transistor M1a and the second MOS transistor M2a in the first branch would operate in the linear region, resulting in a low mirror image precision of the current. In the present embodiment, an auxiliary current is added to each branch of M1a/M2a, wherein the auxiliary current added to the first MOS transistor M1a is the first auxiliary current Isink1, and the auxiliary current added to the second MOS transistor M2a transistor is the second auxiliary current Isink2.

Optionally, the first auxiliary current may be equal to the second auxiliary current or not. In the present embodiment, the first auxiliary current is equal to the second auxiliary current, that is, Isink1=Isink2. The values of the first auxiliary current and the second auxiliary current may be 20 uA, or other values set according to requirements, and the present embodiment is not meant to be a limitation on the values of the first auxiliary current and the second auxiliary current.

Additionally, in the present embodiment, the trigger module may be implemented as a Schmitt trigger, and the resistance value of the sense resistor meets the following conditions: R_det*($I_{pd.leak}$+Isink1) is less than or equal to the flipped voltage of the Schmitt trigger, where R_det is the resistance value of the sense resistor, $I_{pd.leak}$ is the leakage current, Isink1 is the first auxiliary current output by the first auxiliary current input terminal. Therefore, the value of R_det*(Ipd.leak+Isink1) would not be greater than the flipped voltage of the Schmitt trigger, and at this time, Vcon is a low-level (GND), SW1 is switched off, Vconf is a high-level (supply voltage, or chip internal reference voltage), SW2 is short out, M1b/M2b/M3b are cut off, the first MOS transistor M1a and the second transistor M2a operate in the saturation mode, thereby improving the mirror image precision of the current mirror, that is the precision of RSSI.

At this time, the leakage current of the PD obtained through RSSI is: I.RSSI=($I_{pd.leak}$+Isink1)−Isink2.

Operation 2: detecting the working current. As the current generated by the optical signal on the PD increases, the current I_det obtained from the mirror image of the current mirror M1a/M1b to M3a/M3b is also increased. At this time, the resistance value of R_det needs to meet the condition of the leakage current detection as mentioned above, the voltage value of R_det , R_det*(Ipd.leak+Isink1), needs to be not greater than the flipped voltage of the Schmitt trigger, and R_det*(I_PD+Isink1) needs to be greater than the flipped voltage of the Schmitt trigger. Therefore, when detecting the working current, Vcon is a high-level (supply voltage, or chip internal reference voltage), Vconf is a low-level (GND), and then the two logical switches SW1 and SW2 controlled by Vcon and Vconf are on and off respectively. At this time, M1a/M2a/M3a, and M1b/M2b/M3b all operate in the saturation mode, resulting in a high precision of the current mirror I_RSSI: I_PD=Mrssi: M=1:1, where I_PD is the working current.

Optionally, when the number of the second branch is at least two, the dynamic detection range of the optical detection device may be further extended. At this time, the current dynamic range of the PD would be divided into more than two sub-dynamic ranges, and each second branch corresponds to a sub-dynamic range, thereby further improving the mirror image precision of the current mirror, that is, improving the RSSI precision.

Specifically, according to the above-described operating principle, the idea of the present disclosure is that dividing the current dynamic range of the PD into two sections: small current section and large current section. Accordingly, a large dynamic range could be divided into multiple smaller dynamic range intervals by adjusting the size of R_det. For example, the dynamic range of 10 uA-3 mA could be divided into two smaller dynamic range intervals, 10 uA-150 uA and 150 uA-3 mA. (As described herein, the range dividing point 150 uA may also be implemented as other values as required; while in the present embodiment, the point 150 uA is only used as an example for illustration). Furthermore, the current dynamic range of the PD could be divided into three smaller range intervals resulting in a higher RSSI precision. (The current dynamic range of the PD could be divided into even more than three smaller range intervals, while the following description takes an example of three range intervals for illustration.) Referring to FIG. 7 and FIG. 8, in order to obtain three range intervals, R_det is divided into two series resistors; and the two series resistors is used to control the dividing of M1$b$1/ M1$b$2, M2$b$1/ M2$b$2, M3$b$1/ M3$b$2 of the optical detection module as shown in FIG. 5 through two corresponding Schmitt triggers. (i.e., each of M1$b$, M2$b$, M3$b$ has been correspondingly divided into two parts: M1$b$1/M1$b$2, M2$b$1/M2$b$2, and M3$b$1/M3$b$2). At this time, the current dynamic range of the PD 10 uA-3 mA has been divided into three small dynamic range 10 uA-100 uA, 100 uA-1 mA, 1 mA-3 mA, (the range dividing points 100 uA, 1 mA may be implemented as other values as required).

An expansion scheme as shown in FIG. 7 is as follows: adding a Schmitt trigger to the optical detection device shown in FIG. 2 to make the flipped values of the two trigger different, resulting in the dividing of different current size, that is, the dividing of different dynamic ranges.

An expansion scheme as shown in FIG. 8 is as follows: dividing R_det into two series resistors; adding a Schmitt trigger to the optical detection device shown in FIG. 2, resulting in the dividing of different current size, that is, the dividing of different dynamic ranges.

It should be added that, when the number of the second branches is at least two, that is, to achieve at least three dynamic range intervals, the number of the MOS transistors of each branch in the optical detection module C is at least three. However, when he number of the MOS transistors of each branch is 2, the external resistor IRSSI would be divided into multiple resistors; correspondingly, multiple chip pins PAD need to be added to the optical detection device to feed back the segment voltage to the internal Schmitt trigger.

Optionally, the optical detection device also includes an error amplifier A to keep the reversed bias voltage of the PD consistent with the reference voltage Vref, thereby stabilizing the reversed bias voltage of the PD.

Referring the FIG. 2, the error amplifier A comprises: a first voltage input terminal Vref, a second voltage input terminal Vip, and a voltage output terminal Vo.

The first voltage input terminal Vref is used to receive a reference voltage;

The second voltage input terminal Vip used to receive the reversed bias voltage from the photoelectric conversion device;

The voltage output terminal Vo is connected to the G poles of the MOS transistors in the first branch to input stable bias voltage to the MOS transistors in the first branch.

The optical detection device further comprises a voltage source input terminal. When the MOS transistors are implemented as NMOS, the voltage source input terminal is a grounding terminal GND to connect to the ground wire. When the MOS transistors are implemented as PMOS, The voltage source input terminal is a supply voltage input terminal VCC to connect to the supply voltage.

In conclusion, provided optical detection system comprises a photoelectric conversion device and an optical detection device connected to the photoelectric conversion device. The optical detection device comprises: a photocurrent input terminal configured to receive the photocurrent output by the photoelectric conversion device; a first branch connected to the photocurrent input terminal, comprising a plural of MOS transistors; a second branch connected to the photocurrent input terminal, comprising a plural of MOS transistors, wherein the MOS transistors in the first branch and the MOS transistors in the second branch are arranged in a mirror image manner; a control module connected to the first branch and the second branch to turn on or off the MOS transistors in the second branch under the control of the control voltage; a first auxiliary current input terminal connected to the first branch and a second auxiliary current input terminal connected to the first branch, which are used to compensate the current of the MOS transistors in the first branch when the photocurrent is a leakage current; a first current output terminal connected to the first branch and the second branch, wherein the current value of the photocurrent is determined based on the current from the first current output terminal. It may solve the problem of low detection accuracy due to the dynamic detection range of the traditional optical detection devices which is smaller than the current range of the photocurrent output by the PD; make all the on-state MOS transistors in the first branch operate in the saturation mode when detecting the leakage current of the PD, and make all the on-state MOS transistors in the second branch operate in the saturation mode when detecting the working current of the PD, thereby achieving a accurate detection of the leakage current and the working current.

In addition, the current output from the optical detection module controls the trigger module to generate a control voltage to control the on/off of each branch in the optical detection module reversely, thereby realizing the adaptive control of the optical detection device Additionally, at least two second branches are configured, thus the dynamic range of the PD current can be adaptively divided into at least three small ranges to expand the dynamic range.

Furthermore, high detection accuracy and stable reversed bias voltage of the PD could be achieved through connecting the error amplifier to the optical detection module.

Optionally, the optical detection device 120 in the embodiment of the optical detection system as above-described may be implemented as an independent embodiment.

The technical features of the foregoing embodiments may be combined arbitrarily. For the sake of brevity, all possible combinations of the technical features of the foregoing embodiments are not described. However, as long as there is no contradiction in the combinations of these technical features, all shall be considered to be within the scope of this specification The foregoing description has been made on several embodiments of this disclosure which are relatively specific and detailed, however the disclosure is not limited thereto. It should be further understood by those skilled in the art that various changes and modifications may be made without departing from the spirit of the disclosure are protected by this disclosure. Therefore, the scope of protection for this disclosure shall be subject to the appended claims.

What is claimed is:

1. An optical detection device comprising an optical detection module wherein the optical detection module comprises:
    a photocurrent input terminal configured to receive a photocurrent output by a photoelectric conversion device;
    a first branch connected to the photocurrent input terminal, comprising at least three MOS transistors;

a second branch connected to the photocurrent input terminal, comprising at least three MOS transistors;

wherein the MOS transistors in the first branch and the MOS transistors in the second branch are arranged in a mirror current manner;

a control module connected to the first branch and the second branch to switch on or off the MOS transistors in the second branch under a control of a control voltage;

a first auxiliary current input terminal and a second auxiliary current input terminal connected to the first branch, which are used to compensate a current of the MOS transistors in the first branch when a photocurrent is a leakage current;

a first current output terminal connected to the first branch and the second branch, wherein a current value of the photocurrent is determined based on a current from the first current output terminal.

2. An optical detection device of claim 1, wherein the first branch comprises:

a first MOS transistor connected to the photocurrent input terminal and the first auxiliary current input terminal;

a second MOS transistor connected to the second auxiliary current input terminal.

3. An optical detection device of claim 2, wherein when the optical detection device detects the leakage current of the photoelectric conversion device, the control voltage controls a cut-off of the MOS transistors in the second branch;

a first auxiliary current of the first auxiliary current input terminal and a leakage current of the photocurrent input terminal make the first MOS transistor operate in a saturation mode;

a second auxiliary current of the second auxiliary current input terminal makes the second MOS transistor operate in the saturation mode.

4. An optical detection device of claim 1, wherein the control module comprises a first control switch and a second control switch wherein, when the first control switch is off, and the second control switch is on, the MOS transistors in the second branch are turned off, and the optical detection module is in a leakage current detection mode;

when the second control switch is off, and the first control switch is on, the MOS transistors in the second branch are turned on, and the optical detection module is in a working current detection mode.

5. An optical detection device of claim 1, wherein one end of a first control switch is connected to the G poles of the MOS transistors in the first branch, and an other end is connected to the G poles of the MOS transistors in the second branch;

one end of a second control switch is connected to the G poles of the MOS transistors in the second branch, and an other end is connected to a voltage source.

6. An optical detection device of claim 4, wherein the optical detection device further comprises a trigger module to output the control voltage, wherein a first output terminal of the trigger module is connected to the first control switch to turn on or off the first control switch through a first control voltage;

a second output terminal of the trigger module is connected to the second control switch to turn on or off the second control switch through a second control voltage.

7. An optical detection device of claim 6, wherein the optical detection module further comprises a second current output terminal connected to the first branch and the second branch;

wherein an input terminal of the trigger module is connected to the second current output terminal through a voltage detection circuit, so as to convert an output current of the second current output terminal into a voltage signal and input it to the trigger module;

when the photocurrent is a leakage current, the voltage detection circuit converts the output current of the second current output terminal into a first voltage signal and inputs it to the trigger module, thereby making the first control voltage a low-level, and the second control voltage a high-level;

when the photocurrent is a working current, the voltage detection circuit converts the output current of the second current output terminal into a second voltage signal and inputs it to the trigger module, thereby making the first control voltage a high-level, and the second control voltage a low-level.

8. An optical detection device of claim 7, wherein when there are at least two second branches configured, each second branch corresponds to a group of first control switches and second control switches, and each second branch corresponds to a trigger module and a voltage detection circuit connected to the trigger module;

each detection range of the working current corresponding to each second branch has a different value, and each flipped voltage of the trigger module corresponding to each second branch has a different value, the flipped voltage refers to the voltage value that makes the first control voltage and the second control voltage flip.

9. An optical detection device of claim 7, wherein the trigger module is a Schmitt trigger; and the voltage detection circuit comprises a sense resistor with one end grounded and the other end connected to the second current output terminal and the input terminal of the trigger module;

the resistance value of the sense resistor meets the following conditions:

R_det*($I_{pd.leak}$+Isink1) is less than or equal to a flipped voltage of the Schmitt trigger;

and R_det*(I_PD+Isink1) is greater than the flipped voltage of the Schmitt trigger;

where R_det is the resistance value of the sense resistor, $I_{pd.leak}$ is the leakage current, Isink1 is a first auxiliary current input by the first auxiliary current input terminal, I_PD is the working current.

10. An optical detection device of claim 1, wherein the optical detection device further comprises an error amplifier comprising:

a first voltage input terminal used to receive a reference voltage;

a second voltage input terminal used to receive a reversed bias voltage from the photoelectric conversion device;

a voltage output terminal connected to the G poles of the MOS transistors in the first branch to input a bias voltage to the MOS transistors in the first branch.

11. An optical detection device of claim 1, wherein ratios between a length and width of channels in different MOS transistors of the first branch are the same; ratios between a length and width of channels in different MOS transistors of the second branch are the same.

12. An optical detection system comprising the optical detection device of claim 1.

* * * * *